United States Patent [19]

Bales

[11] Patent Number: 4,474,937
[45] Date of Patent: Oct. 2, 1984

[54] PHOSPHORUS-MODIFIED POLYESTERCARBONATE RESINS

[75] Inventor: Stephen E. Bales, Midland, Mich.

[73] Assignee: The Dow Chemical Company, Midland, Mich.

[21] Appl. No.: 538,454

[22] Filed: Oct. 3, 1983

[51] Int. Cl.³ .............................................. C08G 63/68
[52] U.S. Cl. .................................. 528/169; 528/125; 528/128; 528/167; 528/168
[58] Field of Search ............................... 528/167–169, 528/125, 128

[56] References Cited

U.S. PATENT DOCUMENTS 3,578,634  5/1971  Bialous et al. .................. 528/169
3,766,139 10/1973  Bialous et al. .................. 528/169
4,094,926  6/1978  Sheard et al. ................... 528/169
4,156,663  5/1979  Okamoto et al. ................ 528/169
4,223,104  9/1980  Kim et al. ....................... 528/169
4,322,520  3/1982  Schmidt et al. ................. 528/167

Primary Examiner—Lester L. Lee
Attorney, Agent, or Firm—August J. Borschke

[57] ABSTRACT

Phosphorus-modified polyestercarbonate resins having repeating units of the formula:

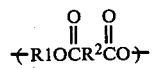

I.

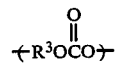

II.

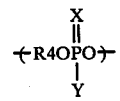

III.

exhibit improved thermal-oxidative stability compared to polyestercarbonates of the prior art comprised of repeating units I and II only. Such resins are useful for making transparent tough films and molded articles having high stability to thermal-oxidative degradation.

6 Claims, No Drawings

PHOSPHORUS-MODIFIED POLYESTERCARBONATE RESINS

BACKGROUND OF THE INVENTION

This invention relates to linear ester carbonate copolymers that contain carbonate groups, phosphorus groups and ester groups in the linear chain.

Polyestercarbonates, formed by the reaction of a diol with a dicarboxylic acid or diacid halide and phosgene, have been described for example in U.S. Pat. Nos. 3,030,331; 3,169,121; 3,220,976; 4,156,069; 4,278,787; 4,330,662 and 4,360,656. The polyestercarbonates, such as those derived from bisphenol-A, phosgene, and terephthaloyl and isophthaloyl chloride, generally exhibit higher heat resistance compared to bisphenol-A polycarbonate. As a result of this increased heat resistance, the polyestercarbonates generally require higher fabrication temperatures and are targeted for higher temperature end-use applications as compared to bisphenol-A polycarbonate. However, the increased fabrication and end-use temperatures can lead to deterioration of the polyestercarbonate, as evidenced by discoloration and decreases in molecular weight.

In view of the aforementioned deficiencies of conventional polyestercarbonates, it would be highly desirable to provide a polyestercarbonate of essentially the same or similar monomeric materials as are known in the art wherein improved thermal-oxidative stability is obtained without the necessity of blending post-polymerization additives with such a polymer. In addition to eliminating an additive blending step, it is desirable to provide a more uniform distribution of stabilizer moieties, a reduced probability of extracting or leaching the stabilizer moieties from fabricated articles, and a low level of stabilizer moieties in order that the desirable properties of conventional polyestercarbonates are not sacrificed.

SUMMARY OF THE INVENTION

Accordingly, the present invention is a modified polyestercarbonate with improved thermal oxidative stability. The polymer is a phosphorus-modified polyestercarbonate compound containing repeating units designated as follows:

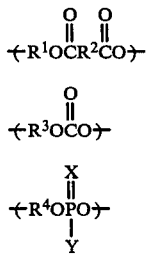

wherein each of $R^1$—$R^4$ are independently hydrocarbylene, aromatic hydrocarbylene or inertly substituted aromatic hydrocarbylene; X is a lone pair of electrons, oxygen or sulfur; and Y is an alkyl, alkoxy, aryl or aryloxy substituent.

The polymer of this invention is a normally-solid material comprising the reaction product of (1) dihydric hydrocarbylenes; (2) dicarboxylic acid halides, (3) phosgene or other carbonate precursors; and (4) dihalo phosphorus monomers. For purposes of this invention, the term "hydrocarbylene" is meant to include a predominantly hydrocarbon divalent radical including aliphatic and/or aromatic hydrocarbon diradicals as well as hydrocarbon radicals linked together by

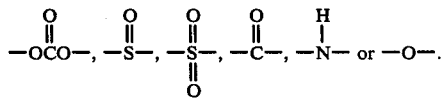

The term "inertly substituted" group is one having one or more substituents which are inert in the condensation reaction used to prepare the polymer.

The copolymers prepared in the practice of this invention are useful in most applications in which polycarbonates, polyesters and copolymers thereof are conventionally employed. In particular, such copolymers are useful for making transparent, tough films and molded articles having high heat resistance. In addition, these copolymers can be blended with other polymers such as carbonate polymers such as polycarbonates, ABS resins, styrene/acrylonitrile copolymers and impact polystyrenes to provide moldable blends and/or they can be combined with reinforcing fibers, such as glass fibers in the production of various molded articles.

Detailed Description of Illustrative Embodiments

The dihydric organic compound employed in the practice of this invention is suitably any predominantly hydrocarbon compound containing at least two alcoholic hydroxyl groups wherein alcoholic hydroxyl includes phenolic hydroxyl. Included within the dihydric hydrocarbylenes are aliphatic diols including glycols and cycloaliphatic diols, aromatic diols, including alkaryl diols, dihydric phenols and aromatic diols having heterocyclic groups such as phenolphthalein. Of the dihydric hydrocarbylenes, the dihydric phenols are preferred.

The dihydric phenols preferably used in preparing the copolymers of the present invention are suitably any aromatic compound having an aromatic hydrocarbylene group to which is aromatically bonded two hydroxyl groups. Most advantageously, the dihydric phenols are those aromatic diols represented by the formula:

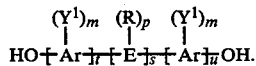

In the formula, Ar is an aromatic group such as phenylene, biphenylene, naphthenylene, anthracenylene and the like. E is alkylene or alkylidene such as methylene, ethylene, ethylidene, propylene, propylidene, isopropylidene, butylene, butylidene, isobutylidene, amylene, isoamylene, amylidene, and isoamylidene or E may be cycloalkylene such as cyclopentylene, cyclohexylene; a sulfur-containing linkage such as sulfide, sulfoxide or sulfone, an ether linkage; a carbonyl group; a tertiary nitrogen group or a silicone-containing linkage such as silane or siloxy. R is hydrogen or a monovalent hydrocarbon group such as alkyl, aryl, arylalkyl or cycloaliphatic; $Y^1$ is chlorine, bromine, fluorine or R wherein R is defined above. The letter m is any whole number from and including zero through the number of positions on Ar available for substitution; p is any whole number from and including zero through the number of available positions on E; t is a whole number equal to at least one; s is either zero or one and u is any whole number including zero. Examples of such dihydric phenols include 2,2-bis-(4-hydroxyphenyl)propane [bisphenol-A]; bis-(4-hydroxyphenyl)methane; 1,1-bis-(4-hydroxyphenyl)ethane and others including dihydroxy aromatic ethers listed in U.S. Pat. No. 3,169,121 at Col. 2, line 60 through Col. 3, line 55.

Also included among the suitable dihydric phenols are those having an ar,ar'-dihydroxytrityl nucleus represented by the formula:

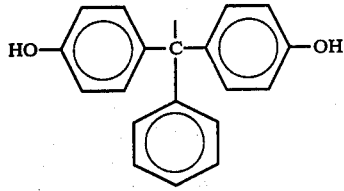

wherein the aromatic rings bear, in addition to the hydroxy substituents, such substituents as H, F, Cl, Br, I, —$NO_2$, —O—, alkyl, acyl, carboxylate ester, sulfonate ester and the like. Representative diols containing the ar,ar'-dihydroxytrityl nucleus include phenolphthalein nucleus compounds as described in U.S. Pat. No. 3,036,036; phenolsulfonephthalein nucleus compounds described in U.S. Pat. No. 3,036,037; phthalidene nucleus compounds as described in U.S. Pat. No. 3,036,038; fluorescein nucleus compounds as described in U.S. Pat. No. 3,036,039 and phenolphthalimidene nucleus compounds corresponding to the phenolphthalein nucleus compounds described in U.S. Pat. No. 3,036,036; all of which patents are hereby incorporated by reference. Of the aforementioned dihydric phenols, the bis(ar-hydroxyphenyl)alkylidenes, particularly bisphenol-A, are most preferred.

The diacid halides that are suitably employed include both the acid halides of the aromatic and the saturated aliphatic dibasic acids. The saturated aliphatic dibasic acids which can be employed are derived from straight chain paraffin hydrocarbons such as oxalic, malonic, dimethyl malonic, succinic, glutaric, adipic, pimelic, suberic, azelaic and sebacic acid as well as the halogen substituted aliphatic dibasic acids. The aliphatic carboxylic acids containing heteroatoms in their aliphatic chain, such as thio-diglycollic or diglycollic acid can also be used as well as unsaturated diacids such as maleic or fumaric. Examples of aromatic and aliphatic aromatic dicarboxylic acids which can be employed in their acid chloride form are phthalic, isophthalic, terephthalic, homophthalic, ortho-, meta- and para-phenylenediacetic acid; the polynuclear aromatic acids such as diphenic acid, 1,4-naphthalic acid and 2,6-naphthalic acid. Of the foregoing diacid halides, preferred are isophthaloyl chloride, terephthaloyl chloride, as well as mixtures thereof, with the mixtures being most preferred. The preferred isophthaloyl and terephthaloyl halides are prepared by reacting the desired isophthalic acid or terephthalic acid with thionyl chloride or other thionyl halide in aromatic solvent under conditions such as those described in *High Polymers,* Vol. XXVII, "Condensation Monomers," J. K. Stille and T. W. Campbell, editors, pages 509–514, Wiley-Interscience, 1972.

The carbonate precursor employed is suitably a carbonyl dihalide, a haloformate or other compound which will suitably react with terminal hydroxyl groups to form carbonate linkages. The carbonyl halides which may be employed are carbonyl bromide, carbonyl chloride (phosgene) and mixtures thereof. Suitable haloformates include bishaloformates of dihydric phenols such as bischloroformates of hydroquinone or glycols such as bishaloformates of ethylene glycol, neopentyl glycol, polyethylene glycol and the like. Of the foregoing carbonate precursors, phosgene is preferred.

The dihalo phosphorus species is most advantageously represented by the formula:

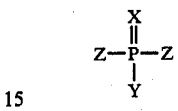

wherein X is a lone pair of electrons, oxygen or sulfur; Y is alkyl, alkoxy, aryl, or aryloxy; and Z is halogen, preferably chlorine or bromine. The repeating unit within the polymer can be a phosphonite, phosphite, phosphonate or phosphate species. Preferably, the dihalo phosphorus species are dichlorophosphorus species of the formulas:

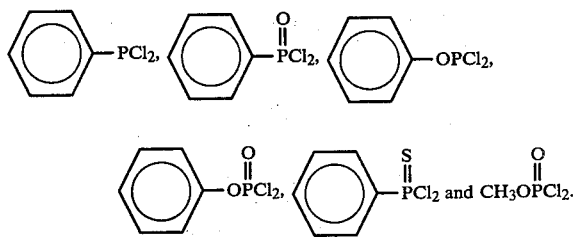

The modified polyestercarbonates of this invention are advantageously prepared by either solution or interfacial polymerization processes. Representative solution and interfacial processes for the preparation of polyestercarbonates by the reaction of a dihydric hydrocarbylene with diacid halides and phosgene are described in U.S. Pat. Nos. 4,156,069; 4,278,787; 4,330,662; 4,360,656; 4,388,455; 4,194,038; 4,238,596; 4,238,597; 4,255,556; 4,252,939; 4,260,731 and 4,369,303 and articles by Kolesnikov et at. published in Vysokomol. Soedin as B9, 49 (1967); A9, 1012 (1967); A9, 1520 (1967) and A10, 145 (1968). These prior art processes can be adapted to the preparation of the polymers of this invention by the addition of a reaction step where a dihalo phosphorus compound is added to a dihydric hydrocarbylene. The dihalo phosphorus compound can be added prior to, concurrently with, or following the addition of diacid chloride, or it can be added prior to or concurrently with the addition of phosgene. It is preferably that the dihalo phosphorus be added to the reaction mixture no later than the addition of phosgene to the reaction mixture. The dihalo phosphorus compound can be added either neat or dissolved in a suitable inert solvent. Additional process variables, such as reactant addition times, concentration, temperature, hydrogen halide acceptor, molecular weight regulator, and reactant addition sequence are essentially the same as described in the prior art processes.

The phosphorus-modified polyestercarbonates produced in the preferred practices of this invention are advantageously represented by the formula:

wherein $B^1$ and $C^1$ are independently terminating groups common to polyesters or polycarbonates; $A^1$ comprises repeating units I, II and III as described hereinbefore; and n is a whole number from about 5 to about 300. The molar ratio of repeating units I:II is from 0.05:1 to 10:1. Using the aforementioned repeating units, the ester/carbonate mole ratio in the copolymer is defined by 2I/II. Each of $R^1$, $R^3$ and $R^4$ is independently a divalent organic moiety derived from the dihydric hydrocarbylene as defined hereinbefore, especially aromatic hydrocarbylene or inertly substituted aromatic hydrocarbylene; each $R^2$ is a divalent organic radical derived from a diacid halide as described hereinbefore, especially phenylene or other divalent aromatic moiety. Each of $R^2$, X and Y are as defined hereinbefore. Unit III is selected and employed such that the amount of elemental phosphorus present in the polymer of this invention can range from about 1 to about 1000, preferably 1 to about 100, most preferably 1 to about 50 parts by weight per million weight parts of polymer.

Illustratively, $B^1$ is $$-OH, \; R^5O\overset{O}{\underset{\|}{C}}O-, \; HO\overset{O}{\underset{\|}{C}}R^2\overset{O}{\underset{\|}{C}}O-, \; R^5O\overset{O}{\underset{\|}{C}}R^2\overset{O}{\underset{\|}{C}}O-,$$

$$HOR^1O\overset{O}{\underset{\|}{C}}R^2\overset{O}{\underset{\|}{C}}O-, \; R^5\overset{O}{\underset{\|}{C}}O- \; \text{or} \; HO\overset{X}{\underset{\underset{Y}{|}}{\overset{\|}{P}}}O-$$

wherein $R^5$ is hydrocarbyl such as alkyl, aryl or aralkyl; and $R^1$, $R^2$, X and Y are as defined hereinbefore. Representative $C^1$ includes $$R^5-, \; H- \; \text{or} \; HOR^1-$$

wherein $R^5$ and $R^1$ are as defined hereinbefore.

In the foregoing formula, $R^2$ is preferably para-phenylene, meta-phenylene or a combination of para-phenylene and meta-phenylene such that the molar ratio of para-phenylene to meta-phenylene is from about 0.95:0.05 to about 0.05:0.95, preferably from about 0.95:0.05 to about 0.2:0.8, most preferably from about 0.9:0.1 to about 0.5:0.5.

$R^1$, $R^3$ and $R^4$ are preferably

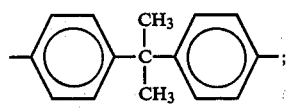

X is preferably oxygen, sulfur or a lone pair of electrons; Y is preferably aryl or aryloxy, $B^1$ is preferably $$R^5O\overset{O}{\underset{\|}{C}}O- \; \text{or} \; R^5\overset{O}{\underset{\|}{C}}O-;$$

$C^1$ is preferably $R^5-$; wherein $R^5$ is preferably

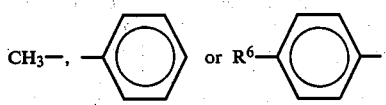

wherein $R^6$ is a hydrocarbyl radical containing from 1 to about 12 carbon atoms; and n is a whole number from about 5 to about 300, preferably from about 10 to about 200 and most preferably from about 30 to about 100.

While the molecular weight of the copolymers is not particularly critical, those having weight average molecular weight ($M_w$, determined by gel permeation chromatography using a bisphenol-A polycarbonate calibration curve) greater than 20,000 are of more significance. The copolymers of relatively high molecular weight, e.g., those having an $M_w$ of at least about 25,000 up to and including those having an $M_w$ of about 60,000, are found to exhibit the properties and physical characteristics most desirable of molding resins. Most preferred for this purpose are those copolymers having an $M_w$ in the range from about 25,000 to about 40,000 and $M_w/M_n$ (wherein $M_n$ is number average molecular weight) from about 1.5 to about 5. Preferred copolymers have inherent viscosities (measured in methylene chloride at 0.5 grams (g)/deciliter and 25° C.) in the range from about 0.35 to about 1 deciliter/g (dl/g), most preferably from 0.45 to 0.70 dl/g.

The following examples are given to illustrate the invention and should not be construed as limiting its scope. Unless otherwise indicated, all parts and percentages are by weight.

EXAMPLE 1

In step 1 of a 3-step process, a 5-liter flask is charged with 283.97 g (1.2439 moles) of bisphenol-A, 3 liters of methylene chloride and 261.6 ml (3.234 moles) of pyridine. Stirring is begun at 250 rpm, and when a clear solution of bisphenol-A is obtained, 0.013 g (6.2×10⁻⁵ moles) of phenylphosponothioc dichloride are added continuously to the reaction vessel over a period of 1 minute while continuously stirring the contents of the flask at 22° and 250 rpm. The phosphorus compound is added to the reaction mixture via a liquid addition funnel. The mixture is stirred for 30 minutes.

In step 2, the aforementioned reaction mixture containing the intermediate is cooled to 17° C. and 126.2 g (0.6227 mole) of terephthaloyl chloride are added over about 3 minutes. The mixture is stirred for about 10 minutes, and then 6.06 g (0.0404 mole) of p-tert-butyl phenol (chain terminator) are added.

In step 3, the aforementioned reaction mixture is continuously agitated at 200 rpm and 67.2 g (0.679 mole) of phosgene is bubbled into the reaction mixture over a period of about 37 minutes at 22°–25° C.

The resulting phosphorus-modified ester/carbonate copolymer is recovered from the reaction mixture by the following procedure:

0.44 Liter of 3N HCl is added to neutralize excess pyridine. Following phase separation, the methylene chloride solution of copolymer is washed consecutively with 0.5 liter of 0.5N HCl and 0.5 liter of water, with phase separation after each washing. Following the final washing, the methylene chloride solution of copolymer is passed through a column packed with a cation exchange resin (sulfonic acid type, dead volume of 500 to 600 milliliters), giving a clear, almost water-white solution. The polymeric product is isolated by the slow addition of 1 volume of methylene chloride solution to 3 volumes of hexane and 1 volume of acetone with rapid stirring. The resulting white fibers are isolated by filtration, dried in air for 24 hours and then dried in vacuo for 48 hours at 120° C. to yield 339.1 g of modified copolymer having an inherent viscosity of 0.628 deciliter/g (measured in $CH_2Cl_2$ at 25° C., 0.5 g/deciliter). Analysis of the copolymer by IR and proton NMR indicates a molar ratio of bisphenol-A residue:terephthalate:carbonate of 2:1:1, which corresponds to an ester:carbonate molar ratio of 2:1. Analysis of the copolymer by atomic emission spectroscopy indicated 6 ppm (0.0006 percent by weight) phosphorus incorporated.

A compression molded disc (0.32 cm thickness, 5.08 cm diameter) of this copolymer (Sample No. 1) is prepared at 275° C. and is suspended in a convection oven at 170° C. for 300 hours. Yellowness index measurements are made according to ASTM D-1925, and the increase in yellowness index ($\Delta YI$) following oven exposure is used as a measure of thermal-oxidative stability. The results are shown in Table I.

Using the procedure of this example, additional modified polyestercarbonates are prepared with a bisphenol-A residue:terephthalate:carbonate ratio of 2:1:1 using different levels of phenylphosphonothioic dichloride to obtain varying levels of phosphorus incorporated in the copolymer. These copolymers (Sample Nos. 2-5) are compression molded as described hereinbefore and tested for thermal-oxidative stability as recorded in Table I.

For purposes of comparison, polyestercarbonates with a bisphenol-A residue:terephthalate:carbonate ratio of 2:1:1 are prepared with no phosphorus incorporated. These copolymers (Sample Nos. $C_1$-$C_6$) are compression molded as described hereinbefore and tested for thermal-oxidative stability as recorded in Table I.

To further illustrate the scope of this invention, additional modified polyestercarbonates with a bisphenol-A:terephthalate:carbonate ratio of 2:1:1 are prepared following the procedure of Example 1 using varying amounts of dichlorophenylphosphine (Sample Nos. 6-11), phenyl phosphorodichloridite (Sample Nos. 12-15), phenyl dichlorophosphate (Sample Nos. 16-20), phenylphosphonic dichloride (Sample Nos. 21-25), and methyl dichlorophosphate (Sample Nos. 26-29). These copolymers are compression molded as described hereinbefore and tested for thermal-oxidative stability as recorded in Table II.

TABLE I

| Sample No. | Phosphorus Monomer | Phosphorus Level, ppm[1] | Inherent Viscosity[2] dl/g | $\Delta YI^3$ |
|---|---|---|---|---|
| $C_1$-$C_6$* | None | None | 0.53-0.59 | 29.1 |
| 1 | Ar—P(S)Cl$_2$[4] | 6 | 0.61 | 1.0 |
| 2 | Ar—P(S)Cl$_2$[4] | 16 | 0.57 | 1.8 |
| 3 | Ar—P(S)Cl$_2$[4] | 28 | 0.56 | 5.2 |

TABLE I-continued

| Sample No. | Phosphorus Monomer | Phosphorus Level, ppm[1] | Inherent Viscosity[2] dl/g | $\Delta YI^3$ |
|---|---|---|---|---|
| 4 | Ar—P(S)Cl$_2$[4] | 66 | 0.55 | 17.6 |
| 5 | Ar—P(S)Cl$_2$[4] | 85 | 0.58 | 17.8 |

*Not an example of the invention.
[1]Determined by atomic emission spectroscopy.
[2]Determined in $CH_2Cl_2$ at 25° C. and 0.5 g/dl.
[3]Increase in yellowness index after oven aging.

[4]Ar is 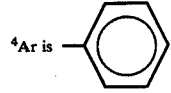

TABLE II

| Sample No. | Phosphorus Monomer | Phosphorus Level, ppm[1] | Inherent Viscosity[2] dl/g | $\Delta YI^3$ |
|---|---|---|---|---|
| $C_1$-$C_6$* | None | None | 0.53-0.59 | 29.1 |
| 6 | Ar—PCl$_2$[4] | 6 | 0.56 | 2.4 |
| 7 | Ar—PCl$_2$[4] | 8 | 0.56 | 6.3 |
| 8 | Ar—PCl$_2$[4] | 13 | 0.55 | 11.7 |
| 9 | Ar—PCl$_2$[4] | 26 | 0.60 | 12.6 |
| 10 | Ar—PCl$_2$[4] | 59 | 0.57 | 19.6 |
| 11 | Ar—PCl$_2$[4] | 110 | 0.60 | 27.9 |
| 12 | Ar—OPCl$_2$[4] | 7 | 0.57 | 8.8 |
| 13 | Ar—OPCl$_2$[4] | 9 | 0.57 | 12.8 |
| 14 | Ar—OPCl$_2$[4] | 16 | 0.53 | 21.2 |
| 15 | Ar—OPCl$_2$[4] | 33 | 0.55 | 27.1 |
| 16 | Ar—OP(O)Cl$_2$[4] | 6 | 0.58 | 2.8 |
| 17 | Ar—OP(O)Cl$_2$[4] | 19 | 0.55 | 3.6 |
| 18 | Ar—OP(O)Cl$_2$[4] | 37 | 0.55 | 10.5 |
| 19 | Ar—OP(O)Cl$_2$[4] | 68 | 0.56 | 16.3 |
| 20 | Ar—OP(O)Cl$_2$[4] | 140 | 0.57 | 29.3 |
| 21 | Ar—P(O)Cl$_2$[4] | 5 | 0.61 | 2.9 |
| 22 | Ar—P(O)Cl$_2$[4] | 27 | 0.54 | 2.7 |
| 23 | Ar—P(O)Cl$_2$[4] | 62 | 0.53 | 5.3 |
| 24 | Ar—P(O)Cl$_2$[4] | 110 | 0.56 | 10.9 |
| 25 | Ar—P(O)Cl$_2$[4] | 170 | 0.59 | 30.5 |
| 26 | $CH_3$OP(O)Cl$_2$ | 5 | 0.56 | 5.7 |
| 27 | $CH_3$OP(O)Cl$_2$ | 17 | 0.59 | 3.9 |
| 28 | $CH_3$OP(O)Cl$_2$ | 38 | 0.57 | 8.4 |
| 29 | $CH_3$OP(O)Cl$_2$ | 68 | 0.56 | 24.8 |

*Not an example of the invention.
[1-4] Same as [1-4] in Table I.

As evidenced by the data of Tables I and II, the modified polyestercarbonates exhibit improved thermal-oxidative stability compared to the control samples of polyestercarbonate which have not been modified using phosphorus incorporation. For the modified polyestercarbonates shown in Tables I and II, the optimum phosphorus incorporation level is typically in the range of 5 to 20 ppm.

EXAMPLE 2

To further illustrate the scope of this invention, additional modified polyestercarbonates (Sample Nos. 30-35) are prepared by the general procedure of Example 1 using various diols, diacid chlorides, dihalo phosphorus monomers, and having various ratios of ester:carbonate. These samples are recorded in Table III.

TABLE III

| Sample No. | Diol, Molar Ratio[1] | DAC, Molar Ratio[2] | E/C[3] | Phosphorus Monomer | Phosphorus Level, ppm[4] | Inherent Viscosity[5] dl/g |
|---|---|---|---|---|---|---|
| 30 | BA | TPC/IPC, 50/50 | 2/1 | Ar—OP(O)Cl$_2$[6] | 5 | 0.48 |
| 31 | BA | TPC/IPC, 50/50 | 2/1 | Ar—P(S)Cl$_2$[6] | 5 | 0.61 |
| 32 | BA | TPC | 0.25/1 | Ar—PCl$_2$[6] | 6 | 0.52 |
| 33 | BA/MeHQ, | TPC | 2/1 | Ar—P(O)Cl$_2$[6] | 6 | 0.58 |

TABLE III-continued

| Sample No. | Diol, Molar Ratio[1] | DAC, Molar Ratio[2] | E/C[3] | Phosphorus Monomer | Phosphorus Level, ppm[4] | Inherent Viscosity[5] dl/g |
|---|---|---|---|---|---|---|
| 34 | BA/PP, 80/20 50/50 | TPC | 4/1 | Ar—OP(O)Cl$_2$[6] | 5 | 0.70 |
| 35 | BA/DHB, 80/20[7] | TPC/IPC, 80/20 | 2/1 | Ar—PCl$_2$[6] | 5 | 0.56 |

[1]BA = bisphenol-A; MeHQ = methylhydroquinone; PP = phenolphthalein; DHB = 4,4'-dihydroxybiphenyl.
[2]TPC = terephthaloyl chloride; IPC = isophthaloyl chloride.
[3]E/C = ester/carbonate molar ratio.
[4]Same as [1] in Table I.
[5]Same as [2] in Table I.

[6]Ar is 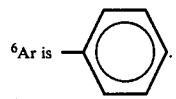

[7]DHB in carbonate repeat unit only.

What is claimed is:

1. A phosphorus-modified polyestercarbonate containing repeating units of the general formulae I, II and III as follows:

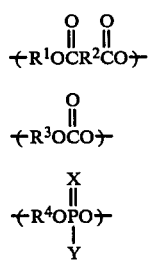

wherein each of R$^1$, R$^2$, R$^3$ and R$^4$ are independently hydrocarbylene, aromatic hydrocarbylene or inertly substituted aromatic hydrocarbylene; X is a lone pair of electrons, oxygen or sulfur; and Y is an alkyl, alkoxy, aryl or aryloxy substituent.

2. A phosphorus modified polyestercarbonate of claim 1 comprising the reaction product of:
   (i) dihydric hydrocarbylenes;
   (ii) dicarboxylic acid halides;
   (iii) carbonate precursors; and
   (iv) dihalo phosphorus monomers.

3. A phosphorus-modified polyestercarbonate of claim 1 represented by the formula:

wherein A$^1$ is comprised of repeating units I, II, and III of claim 1; the molar ratio of repeating units I:II is from 0.05:1 to 10:1; the amount of repeating unit III is such that the amount of phosphorus in the modified polyestercarbonate is from 1 to about 1,000 ppm; each of R$^1$, R$^3$ and R$^4$ is independently aromatic hydrocarbylene or inertly substituted hydrocarbylene; R$^2$ is para-phenylene, meta-phenylene, or a mixture of para-phenylene and meta-phenylene wherein the molar ratio of para-phenylene to meta-phenylene is from 0.95:0.05 to 0.05:0.95; B$^1$ is —OH,

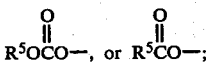

C$^1$ is —R$^1$OH, —R$^3$OH, —R$^4$OH, —R$^5$, or —H; R$^5$ is —CH$_3$,

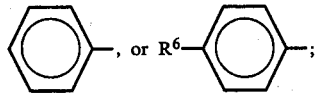

R$^6$ is a hydrocarbylene radical containing from 1 to 12 carbons; and n is a whole number from about 5 to about 300.

4. A modified polyestercarbonate of claim 3 wherein each of R$^1$, R$^3$ and R$^4$ are

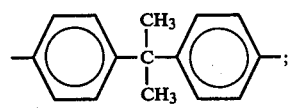

the molar ratio of para-phenylene to meta-phenylene is from about 0.9:0.1 to about 0.5:0.5; the molar ratio of repeating units I:II is from about 0.05:1 to about 5:1; the amount of repeating unit III is such that the amount of phosphorus in the modified polyestercarbonate is from 1 to 100 ppm and n is a whole number from about 30 to 100.

5. The phosphorus-modified polyestercarbonate of claim 4 wherein Y is

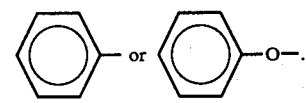

6. A phosphorus modified polyestercarbonate of claim 2 wherein said carbonate precursor is phosgene.

* * * * *